(12) United States Patent
Walrath (10) Patent No.: US 10,136,629 B1
(45) Date of Patent: Nov. 27, 2018

(54) INLINE DEEP SEA FISHING TEASER APPARATUS

(71) Applicant: Michael D. Walrath, Miami Beach, FL (US)

(72) Inventor: Michael D. Walrath, Miami Beach, FL (US)

(*) Notice: Subject to any disclaimer, the term of this patent is extended or adjusted under 35 U.S.C. 154(b) by 251 days.

(21) Appl. No.: 15/075,774

(22) Filed: Mar. 21, 2016

(51) Int. Cl.
 *A01K 91/08* (2006.01)
 *A01K 97/10* (2006.01)
 *A01K 97/00* (2006.01)

(52) U.S. Cl.
 CPC .............. *A01K 97/10* (2013.01); *A01K 91/08* (2013.01); *A01K 97/00* (2013.01)

(58) Field of Classification Search
 CPC ......... A01K 91/08; A01K 97/10; A01K 97/00
 USPC ............. 43/21.2, 27.4, 27.2, 4, 43.13, 43.12
 See application file for complete search history.

(56) References Cited

U.S. PATENT DOCUMENTS

| | | | | |
|---|---|---|---|---|
| 2,786,296 A * | 3/1957 | Loebensteen | .......... | A01K 95/00 242/397.1 |
| 3,355,835 A * | 12/1967 | Lyons | .................. | A01K 89/017 43/27.4 |
| 3,719,331 A * | 3/1973 | Harsch | ............... | A01K 89/0165 242/390.1 |
| 3,785,079 A * | 1/1974 | Rohn | ..................... | A01K 91/08 242/297 |
| 3,844,058 A * | 10/1974 | King | .................. | A01K 89/0165 242/395 |
| 3,898,758 A * | 8/1975 | Swanningson | ........ | A01K 85/16 43/42.48 |
| 3,916,555 A * | 11/1975 | Booth | ..................... | A01K 91/08 174/124 G |
| 3,937,415 A * | 2/1976 | Prinz | .................. | A01K 89/0165 242/297 |
| 3,959,885 A * | 6/1976 | Edmiston | ............... | A01K 91/08 33/1 R |
| 3,961,437 A * | 6/1976 | Lewis | .................... | A01K 91/08 43/27.4 |
| 3,968,587 A * | 7/1976 | Kammeraad | .......... | A01K 91/08 242/397.1 |
| 3,977,118 A * | 8/1976 | Seymour | ................ | A01K 91/08 242/297 |
| 4,014,127 A * | 3/1977 | Turner | ................... | A01K 87/00 43/20 |

(Continued)

FOREIGN PATENT DOCUMENTS

CA        2291575 A1 *  6/2000  ............. A01K 91/08

*Primary Examiner* — Darren W Ark
(74) *Attorney, Agent, or Firm* — Albert Bordas, P.A.

(57) ABSTRACT

An inline deep sea fishing teaser apparatus, having a winch assembly with at least one handle assembly and teaser line. Also having a holder assembly, a teaser assembly, and a rod holder assembly. The winch assembly has a gear assembly allowing for a free spool mode for ease in deploying a teaser secured to the teaser line, and a return mode for retrieving the teaser. The teaser assembly has a depth gauge with an indicator and at least one depth guide to approximate a depth the teaser secured to the teaser line is deployed to by measuring an angle of the teaser line. The holder assembly is inserted into a fishing rod holder positioned on a stern or gunwales of a vessel. The fishing line is approximately inline with the teaser line when both the fishing line and the teaser line are deployed while trolling the vessel.

12 Claims, 8 Drawing Sheets

(56) References Cited

U.S. PATENT DOCUMENTS

| | | | |
|---|---|---|---|
| 4,037,326 A * | 7/1977 | Booth | A01K 91/08 242/223 |
| 4,044,968 A * | 8/1977 | Scott | A01K 89/0165 188/72.8 |
| 4,050,180 A * | 9/1977 | King | A01K 91/08 242/396.9 |
| 4,128,960 A * | 12/1978 | Marek | A01K 91/08 114/205 |
| 4,156,320 A * | 5/1979 | Kammeraad | A01K 91/08 242/396.1 |
| 4,167,829 A * | 9/1979 | Henze | A01K 91/08 43/27.4 |
| 4,248,002 A * | 2/1981 | McNellis | A01K 91/08 242/397.1 |
| 4,274,219 A * | 6/1981 | Way | A01K 91/08 43/27.2 |
| 4,334,380 A * | 6/1982 | Daniels | A01K 89/015 43/27.4 |
| 4,428,139 A * | 1/1984 | Henze | A01K 89/0165 43/27.4 |
| 4,438,582 A * | 3/1984 | Lummis | A01K 91/08 248/538 |
| 4,495,721 A * | 1/1985 | Emory, Jr. | A01K 97/10 43/15 |
| 4,586,286 A * | 5/1986 | Cheatham, Jr. | A01K 91/08 33/720 |
| 4,610,409 A * | 9/1986 | Emory, Jr. | A01K 91/08 254/326 |
| 4,667,892 A * | 5/1987 | Pease | A01K 91/08 242/390.1 |
| 4,716,674 A * | 1/1988 | Kammeraad | A01K 91/08 248/231.9 |
| 4,807,386 A * | 2/1989 | Emory, Jr. | A01K 91/08 43/15 |
| 4,836,127 A * | 6/1989 | Wille | A01K 97/10 114/343 |
| 4,901,469 A * | 2/1990 | Murray | A01K 91/08 43/21.2 |
| 4,903,428 A * | 2/1990 | Sluiter | A01K 91/065 43/26.1 |
| 4,907,347 A * | 3/1990 | Pease | A01K 91/08 33/713 |
| 4,928,420 A * | 5/1990 | Jackson | A01K 91/08 43/27.4 |
| 4,932,602 A * | 6/1990 | Scott | A01K 91/08 242/250 |
| 5,170,581 A * | 12/1992 | Lyons | A01K 91/08 43/17 |
| 5,187,878 A * | 2/1993 | Kuttner | A01K 91/20 33/719 |
| 5,301,451 A * | 4/1994 | VanAssche | A01K 91/08 43/21.2 |
| 5,435,093 A * | 7/1995 | Minorics | A01K 97/10 43/19.2 |
| 5,673,507 A * | 10/1997 | Stokes, Jr. | A01K 97/10 114/364 |
| 5,752,461 A * | 5/1998 | Whisenhunt | A01K 91/08 114/253 |
| 5,778,592 A * | 7/1998 | Malmberg | A01K 97/10 43/21.2 |
| 5,950,345 A * | 9/1999 | Kilander | A01K 85/00 43/2 |
| 5,987,803 A * | 11/1999 | White | A01K 97/10 43/21.2 |
| 6,185,857 B1 * | 2/2001 | Hnizdor | A01K 85/00 43/42.11 |
| 6,505,431 B1 * | 1/2003 | Christian | A01K 91/08 43/19.2 |
| 6,557,481 B1 * | 5/2003 | Schweid | A01K 91/08 43/21.2 |
| 6,640,487 B2 * | 11/2003 | Angwin | A01K 85/01 43/43.12 |
| 6,678,990 B2 * | 1/2004 | Cox | A01K 91/065 114/255 |
| 6,684,558 B1 * | 2/2004 | Gillespie | A01K 91/08 43/26.1 |
| 7,134,235 B2 * | 11/2006 | Gifford | A01K 73/00 43/4 |
| 7,278,233 B2 * | 10/2007 | Melville | A01K 97/10 248/512 |
| 7,296,377 B2 * | 11/2007 | Wilcox | A01K 91/08 114/255 |
| 7,322,226 B1 * | 1/2008 | Rathgeb | A01K 85/00 43/2 |
| 7,757,989 B1 * | 7/2010 | Huffman | A01K 89/00 242/306 |
| 7,946,076 B2 * | 5/2011 | Gascoigne | A01K 89/08 43/4.5 |
| 8,683,735 B1 * | 4/2014 | Figari | A01K 91/08 43/18.1 CT |
| 2005/0034355 A1 * | 2/2005 | Dzenis | A01K 91/08 43/43.13 |
| 2005/0204609 A1 * | 9/2005 | Greene, II | A01K 91/08 43/43.13 |
| 2012/0066954 A1 * | 3/2012 | Barker | A01K 91/08 43/4 |
| 2013/0133241 A1 * | 5/2013 | Barker | A01K 97/02 43/44.9 |
| 2018/0139943 A1 * | 5/2018 | Poston | A01K 91/053 |

* cited by examiner

INLINE DEEP SEA FISHING TEASER APPARATUS

BACKGROUND OF THE INVENTION

1. Field of the Invention

The present invention relates to fishing equipment, and more particularly, to teaser systems for deep sea fishing.

2. Description of the Related Art

Fishing equipment including teaser systems have been developed in the past. None of them, however, suggest the novel features of the present invention.

SUMMARY OF THE INVENTION

The present invention is a two handled winch-style teaser reel and rod holder combination, on a rod butt and gimbal, allowing the apparatus to securely stand in existing deep sea fishing rod holders in the stern or gunwales of a deep sea fishing vessel. The apparatus includes a geared system allowing for a free spool mode, for ease in deploying a teaser dredge or surface teaser, and a return mode for retrieving the teaser. The teaser assembly atop the apparatus contains roller guides to protect the line from chaffing, a protractor depth gauge determines the depth of the teaser (with a fixed length of line deployed) via measuring the angle of the line, and a pivot sleeve allowing the teaser assembly to track the direction of the line as the vessel turns.

The present invention's unique advantages include: 1) the compatibility with existing rod holders in the transom or gunwales of fishing vessels, 2) the two handled design allows for faster retrieval of heavy teaser dredges, 3) the piggybacked rod holder allows the hooked bait of a trolling rod to swim directly behind or "in line" with the teaser dredge, and 4) the protractor depth gauge displays the approximate depth the teaser is deployed to.

More specifically, the present invention is an inline deep sea fishing teaser apparatus, comprising a winch assembly having at least one handle assembly and teaser line. The present invention further comprises a holder assembly, a teaser assembly, and a rod holder assembly.

The holder assembly mounts onto the winch assembly. In a preferred embodiment, the winch assembly comprises first and second handle assemblies. The winch assembly comprises a gear assembly allowing for a free spool mode for ease in deploying a teaser secured to the teaser line, and a return mode for retrieving the teaser.

The teaser assembly mounts onto the holder assembly. The teaser line extends from the winch assembly and the teaser assembly. The teaser assembly comprises a depth gauge having an indicator and at least one depth guide to approximate a depth a teaser secured to the teaser line is deployed to by measuring an angle of the teaser line. The teaser assembly comprises at least one roller guide that the teaser line travels upon. The teaser assembly comprises a pivot sleeve allowing the teaser assembly to track a direction of the teaser line as a vessel turns. The teaser assembly comprises first and second teaser frames, and the roller guide is positioned between them.

The rod holder assembly mounts onto the holder assembly. The holder assembly is inserted into a fishing rod holder positioned on a stern or gunwales of a vessel. The rod holder assembly secures a fishing rod comprising fishing line, and the fishing rod is approximately parallel with the holder assembly when secured thereon. The fishing line is approximately inline with the teaser line when both the fishing line and the teaser line are deployed while trolling the vessel. The fishing line is deployed a greater distance than the teaser line when both the fishing line and the teaser line are deployed while the trolling the vessel. The teaser line secures one or more teaser lures.

It is therefore one of the main objects of the present invention to provide an inline deep sea fishing teaser apparatus.

It is another object of this invention to provide an inline deep sea fishing teaser apparatus that is compatible with existing rod holders in the transom or gunwales of fishing vessels.

It is another object of this invention to provide an inline deep sea fishing teaser apparatus having two handled design that allows for faster retrieval of heavy teaser dredges.

It is another object of this invention to provide an inline deep sea fishing teaser apparatus comprising a piggybacked rod holder that allows the hooked bait of a trolling rod to swim directly behind or "in line" with the teaser dredge.

It is another object of this invention to provide an inline deep sea fishing teaser apparatus comprising a protractor depth gauge that displays the approximate depth the teaser is deployed to.

It is another object of this invention to provide an inline deep sea fishing teaser apparatus that is volumetrically efficient for carrying, transporting, storage, and use.

It is another object of this invention to provide an inline deep sea fishing teaser apparatus that can be readily assembled and disassembled without the need of any special tools.

It is another object of this invention to provide an inline deep sea fishing teaser apparatus, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Referring now to the drawings, the present invention is an inline deep sea fishing teaser apparatus and is generally referred to with numeral 10. It can be observed that it basically includes winch assembly 20, holder assembly 200, teaser assembly 250, and rod holder assembly 300.

Figure 1:
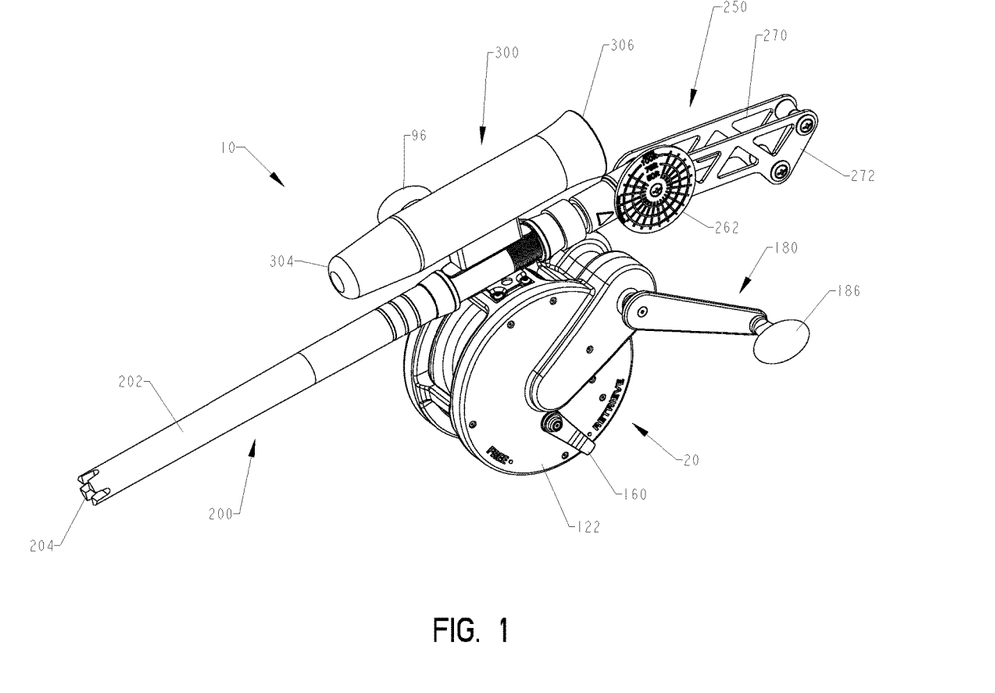
FIG. 1 represents an isometric view of an inline deep sea fishing teaser apparatus, object of the present invention.
Figure 2:
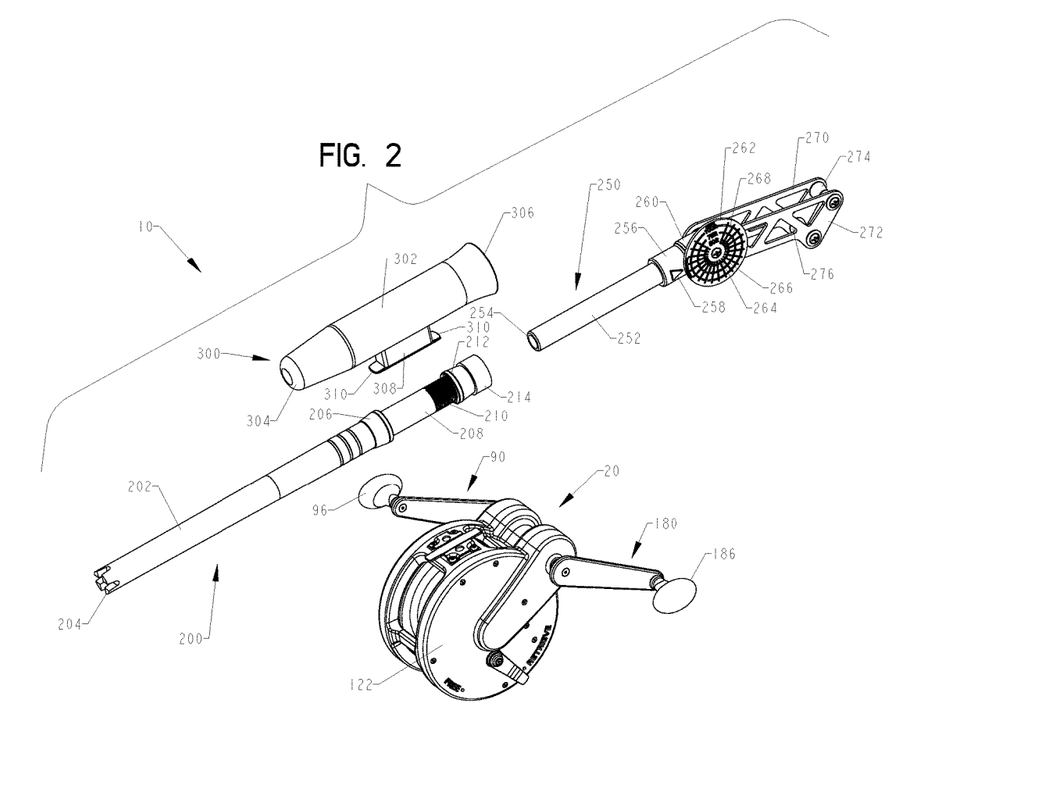
FIG. 2 is a first partially exploded view of the inline deep sea fishing teaser apparatus seen in FIG. 1.
Figure 3:
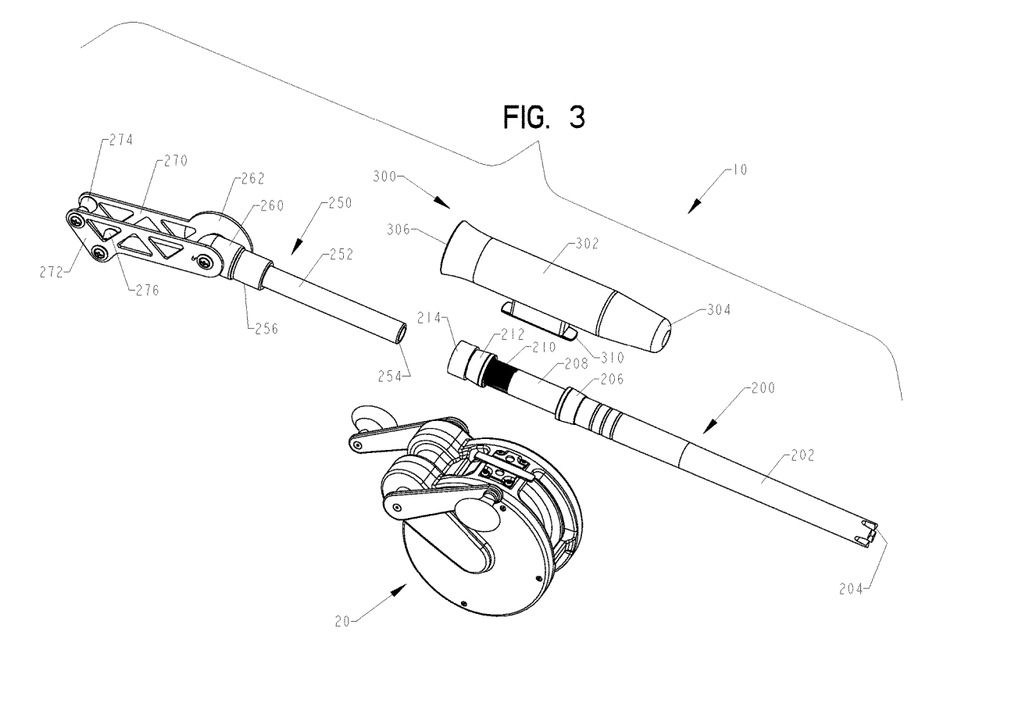
FIG. 3 is a second partially exploded view of the inline deep sea fishing teaser apparatus seen in FIG. 1.

As seen in FIGS. 1, 2, and 3, winch assembly 20 comprises handle assemblies 90 and 180. Holder assembly 200 mounts onto winch assembly 20, teaser assembly 250 mounts onto holder assembly 200, and rod holder assembly 300 mounts onto holder assembly 200.

Holder assembly 200 comprises shaft 202 extending from gimbal 204, and receiving end 214. Mounted onto shaft 202 is hood 206. Shaft 202 extends to seat 208 having threads 210. Threaded onto threads 210 is lock ring 212. Seat 208 receives mount 308 thereon, whereby tabs 310 fit into hood 206 and lock ring 212, both which flare outwardly to accommodate tabs 310.

Figure 8:
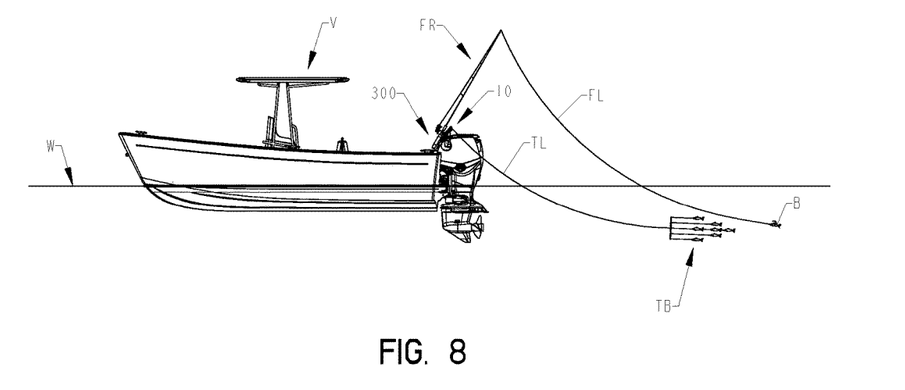
FIG. 8 represents an isometric view of the present invention secured onto a vessel while trolling for fish.

Teaser assembly 250 comprises teaser shaft 252 having teaser end 254. Teaser end 254 is inserted and secured with receiving end 214. Extending from teaser shaft 252 is pivot sleeve 256. Pivot sleeve 256 allows teaser assembly 250 to track a direction of teaser line TL as vessel V turns, seen in FIG. 8. Positioned on pivot sleeve 256 is indicator 258. Extending from pivot sleeve 256 is frame base 260, and extending therefrom are teaser frames 270 and 272. Roller guides 274 and 276 are positioned between teaser frames 270 and 272. Guide teaser line TL, see in FIG. 8, travels upon roller guides 274 and 276. Teaser assembly 250 further comprises depth gauge 262 having at least one depth guide. As an example, depth gauge 262 may have depth guides 264, 266, and 268. Depth guides 264, 266, and 268 can be presented in any unit of length such as feet or meters. Depth guides 264, 266, and 268 approximate a depth of a teaser, such as teaser lures TB secured to teaser line TL, as seen in FIG. 8, are deployed to by measuring an angle of teaser line TL.

Rod holder assembly 300 comprises rod holder 302 having end 304 and edge 306. Protruding from rod holder 302 is mount 308 having tabs 310.

Figure 4:
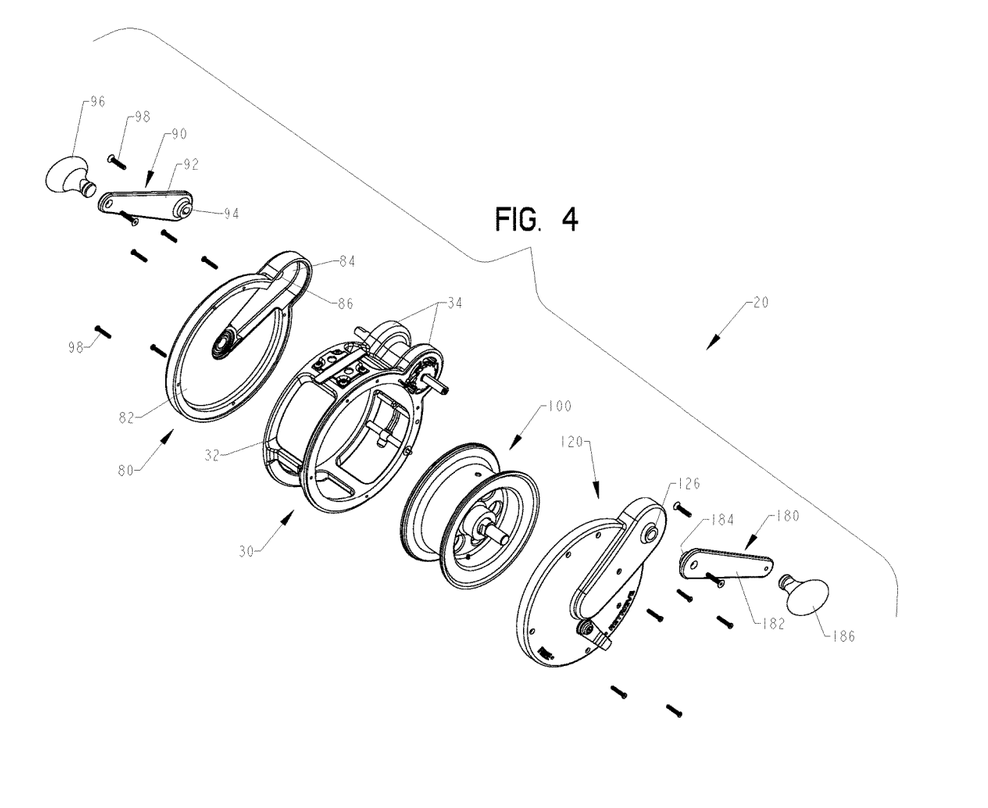
FIG. 4 is a first exploded view of a winch assembly.
Figure 5:
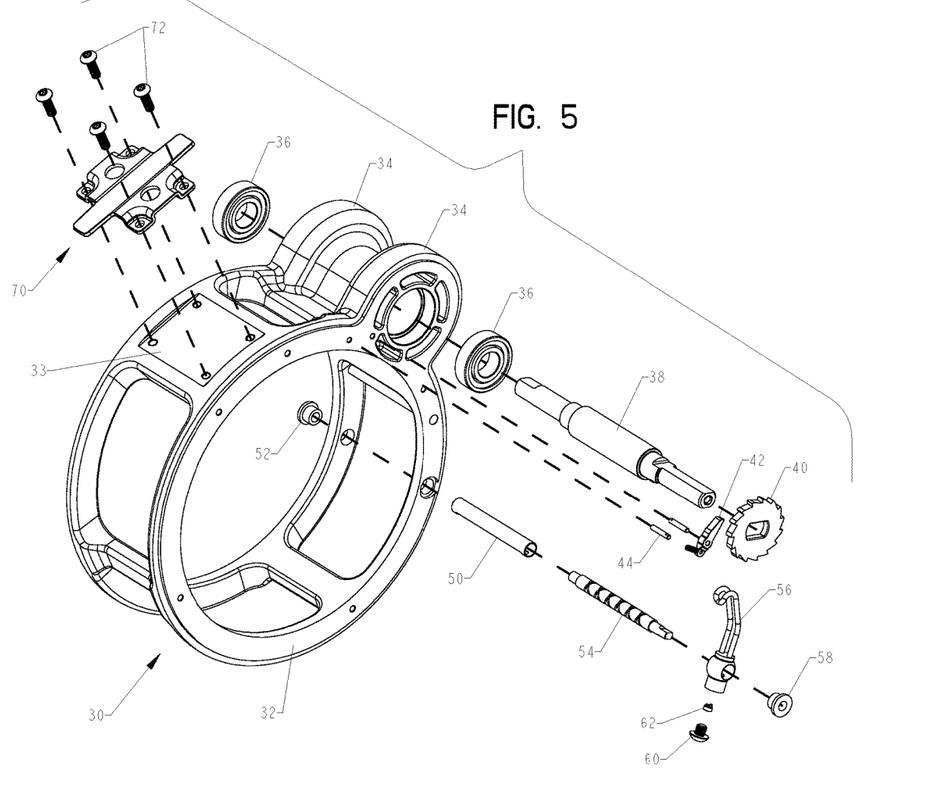
FIG. 5 is an exploded view of a shroud assembly.
Figure 6:
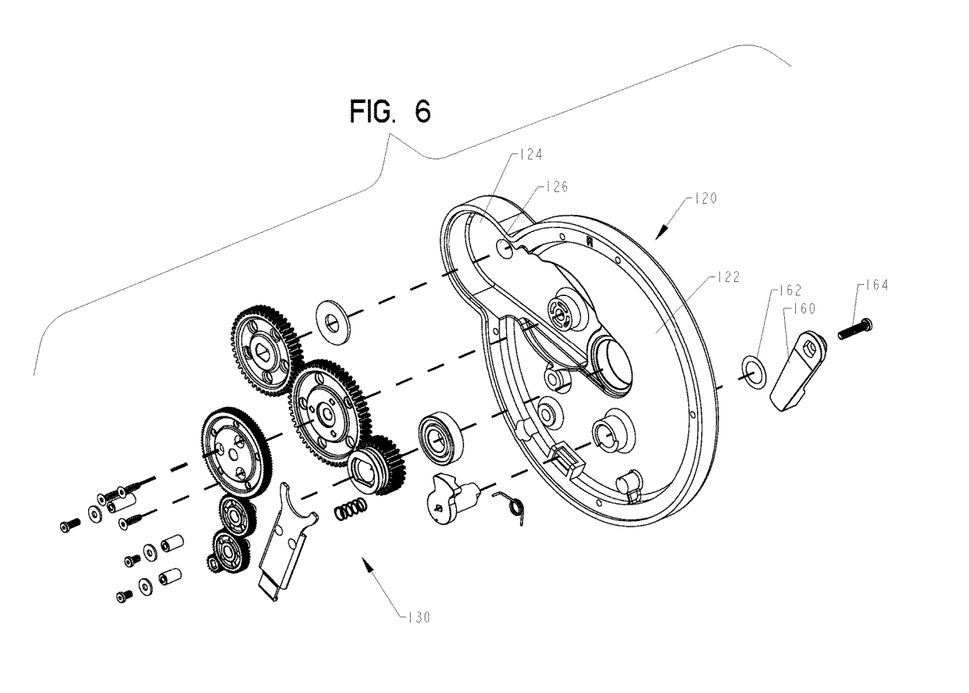
FIG. 6 is a second exploded view of the winch assembly.

As seen in FIGS. 4, 5, and 6, shroud assembly 30 comprises cover assemblies 80 and 120 to house spool shaft assembly 100. Cover assembly 80 comprises side plate 82, and shoulder sidewall 84 having hole 86. Side plate 82 secures onto cover assembly 80 with screws 98. Handle assembly 90 comprises handle 92 having protrusion 94 that secures into hole 86 with a screw 98. Handle 92 comprises knob 96. Cover assembly 120 comprises side plate 122, and shoulder sidewall 124 having hole 126. Side plate 122 secures onto cover assembly 120 with screws 98. Handle assembly 180 comprises handle 182 having protrusion 184 that secures into hole 126 with a screw 98. Handle 182 comprises knob 186.

As best seen in FIG. 5, shroud assembly 30 comprises frame 32 having base 33. Foot 70 secures onto base 33 with screws 72. Holder assembly 200 mounts onto foot 70 of winch assembly 20. Shroud assembly 30 further comprises first and second shoulders 34 that receive first and second bearings 36 respectively. Shaft 38 fits through first and second bearings 36 and has sprocket 40 mounted at one end. Shroud assembly 30 further comprises pins 44 that secure lock 42. Frame 32 comprises at least one hole to receive sleeve 50. Sleeve 50 houses guide shaft 54 to secure guide 56, and all are secured with end caps 52 and 58. Guide 56 is further secured with screw 60 and set screw 62.

As best seen in FIG. 6, shroud assembly 30 further comprises gear assembly 130 having clutch 160. Clutch 160 is secured onto cover assembly 120 with screw 164 having washer 162. Gear assembly 130 allows for a free spool mode for ease in deploying a teaser, such as teaser lures TB secured to teaser line TL, as seen in FIG. 8. Gear assembly 130 also allows for a return mode for retrieving the teaser.

Figure 7:
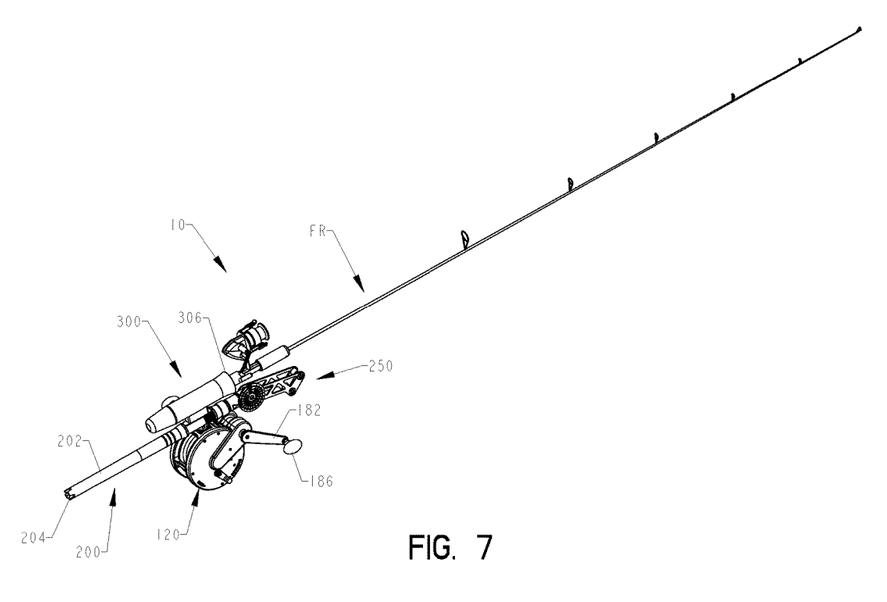
FIG. 7 represents an isometric view of a fishing rod secured onto the present invention.

As seen in FIG. 7, rod holder assembly 300 secures fishing rod FR that is approximately parallel with holder assembly 300 when secured thereon.

As seen in FIG. 8, holder assembly 200 is inserted into a fishing rod holder positioned on a stern or gunwales of vessel V. Rod holder assembly 300 secures fishing rod FR comprising fishing line FL that is approximately inline with teaser line TL when both fishing line FL and teaser line TL are deployed while trolling vessel V in water W. Fishing line FL is deployed a greater distance than teaser line TL when both fishing line FL and teaser line TL are deployed while trolling vessel V, whereby teaser line TL extends from winch assembly 20 and teaser assembly 250. Teaser line TL secures at least one bait and/or teaser lure TB, and fishing line FL secures at least one bait and/or lure B. The at least one bait and/or teaser lure TB, and the at least one bait and/or lure B can be natural and/or artificial.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An inline deep sea fishing teaser apparatus, comprising:
   A) a winch assembly comprising first and second handle assemblies and a teaser line, said winch assembly further comprises a gear assembly allowing for a free spool mode for ease in deploying a teaser secured to said teaser line, said teaser line secured to said teaser which comprises at least one bait and/or teaser lure;
   B) a holder assembly both attached to said winch assembly and being inserted into a fishing rod holder positioned on a stern or gunwale of a vessel;
   C) a teaser assembly attached to said holder assembly and comprising a depth gauge having an indicator, said teaser assembly further comprises a pivot sleeve allowing said teaser assembly to track a direction of said teaser line as said vessel turns, extending from said pivot sleeve is a frame base, and extending from said frame base are first and second teaser frames, said indicator positioned on said pivot sleeve and said depth gauge is secured to said first teaser frame; and
   D) a rod holder assembly both attached to said holder assembly and securing a fishing rod comprising fishing line that is approximately inline with said teaser line when both said fishing line and said teaser line are deployed while trolling.

2. The inline deep sea fishing teaser apparatus set forth in claim 1, further characterized in that said holder assembly being attached to said winch assembly by being mounted onto said winch assembly.

3. The inline deep sea fishing teaser apparatus set forth in claim 1, further characterized in that said teaser assembly being attached to said holder assembly by being inserted into said holder assembly.

4. The inline deep sea fishing teaser apparatus set forth in claim 1, further characterized in that said rod holder assembly being attached to said holder assembly by being mounted onto said holder assembly.

5. The inline deep sea fishing teaser apparatus set forth in claim 1, further characterized in that said teaser line extends from said winch assembly and said teaser assembly.

6. The inline deep sea fishing teaser apparatus set forth in claim 1, further characterized in that said depth gauge comprises at least one depth guide to approximate a depth said teaser secured to said teaser line is deployed to.

7. The inline deep sea fishing teaser apparatus set forth in claim 1, further characterized in that said depth gauge comprises at least one depth guide to approximate a depth said teaser secured to said teaser line is deployed to by measuring an angle of said teaser line.

8. The inline deep sea fishing teaser apparatus set forth in claim 1, further characterized in that said teaser assembly comprises at least one roller guide that said teaser line travels upon.

9. The inline deep sea fishing teaser apparatus set forth in claim 8, further characterized in that said at least one roller guide is positioned between said first and second teaser frames.

10. The inline deep sea fishing teaser apparatus set forth in claim 1, further characterized in that said gear assembly allowing for a return mode for retrieving said teaser secured to said teaser line.

11. The inline deep sea fishing teaser apparatus set forth in claim 1, further characterized in that said fishing line is deployed a greater distance than said teaser line when both said fishing line and said teaser line are deployed while trolling.

12. The inline deep sea fishing teaser apparatus set forth in claim 1, further characterized in that said rod holder assembly secures said fishing rod comprising said fishing line such that said fishing rod is approximately parallel with said holder assembly.

* * * * *